United States Patent
Golovashchenko

(10) Patent No.: US 8,667,823 B2
(45) Date of Patent: Mar. 11, 2014

(54) APPARATUS AND METHOD USING REDUCED VOLUME ELECTRO-HYDRAULIC CHAMBERS FOR TRIMMING AND JOINING PANELS

(75) Inventor: Sergey Fedorovich Golovashchenko, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 13/237,059

(22) Filed: Sep. 20, 2011

(65) Prior Publication Data

US 2013/0067976 A1    Mar. 21, 2013

(51) Int. Cl.
   *B21D 28/14*    (2006.01)

(52) U.S. Cl.
   USPC .............. 72/55; 72/56; 72/57; 72/60; 72/430; 72/707; 29/419.2

(58) Field of Classification Search
   USPC ............ 72/54, 56, 57, 60, 430, 707; 29/419.2
   See application file for complete search history.

(56) References Cited

U.S. PATENT DOCUMENTS

| | | | |
|---|---|---|---|
| 3,200,626 A * | 8/1965 | Meyers | 72/56 |
| 3,358,487 A | 12/1967 | Brejcha et al. | |
| 3,398,561 A | 8/1968 | Zernow et al. | |
| 3,591,760 A * | 7/1971 | Inoue | 205/652 |
| 3,603,127 A | 9/1971 | Seiffert et al. | |
| 3,640,110 A * | 2/1972 | Inoue | 72/56 |
| 3,650,134 A * | 3/1972 | Haeusler | 72/56 |
| 3,750,441 A * | 8/1973 | Schneider et al. | 72/56 |
| 3,894,925 A | 7/1975 | Inoue | |
| 4,030,329 A * | 6/1977 | Chachin et al. | 72/56 |
| 4,635,840 A | 1/1987 | Cenanovic | |
| 6,050,121 A | 4/2000 | Daehn et al. | |
| 6,094,809 A * | 8/2000 | Grassi | 29/802 |
| 6,227,023 B1 | 5/2001 | Daehn et al. | |
| 6,591,649 B1 | 7/2003 | Gafri et al. | |
| 6,708,542 B1 | 3/2004 | Gafri et al. | |
| 2010/0175447 A1 | 7/2010 | Golovashchenko | |

OTHER PUBLICATIONS

V.J. Vohnout et al, Pressure Heterogeneity in Small Displacement Electrohydraulic Forming Processes, 4th International Conference on High Speed Forming, 2010.

Peihui Zhang, Joining Enabled by High Velocity Deformation, Dissertation, The Ohio State University, 2003.

(Continued)

*Primary Examiner* — David B Jones
(74) *Attorney, Agent, or Firm* — Damian Porcari; Brooks Kushman P.C.

(57) ABSTRACT

A tool for modifying a workpiece by either trimming or joining the workpiece. The tool is an electro-hydraulic tool that uses a pulse transmitted through a liquid to trim a workpiece or to join two thicknesses of metal together. A method of trimming the workpiece includes the steps of providing a high voltage discharge in a liquid that drives a workpiece into engagement with a cutting edge of a tool steel insert. A method of joining two or more thicknesses of metal together includes the step of creating a high voltage discharge through an electrode that accelerates one panel or thickness of metal into a second panel that is held stationary by a backing plate while the first thickness of metal is accelerated into the second thickness of metal.

12 Claims, 6 Drawing Sheets

(56) References Cited

OTHER PUBLICATIONS

Glenn S. Daehn, High Velocity Metal Forming, Appendix D, ASM Handbook, vol. 14B, Metalworking: Sheet Forming, Published 2006, ASM International, pp. 405-418.

Didier Priem et al., On the Forming of Metallic Parts through Electromagnetic and Electrohydraulic Processing, Advanced Materials Research vols. 15-17 (2007, pp. 655-660.

Glenn S. Daehn, High Velocity Metal Forming, ASM Handbook, vol. 14, Forming and Forging, 2005.

* cited by examiner

APPARATUS AND METHOD USING REDUCED VOLUME ELECTRO-HYDRAULIC CHAMBERS FOR TRIMMING AND JOINING PANELS

STATEMENT REGARDING FEDERALLY SPONSORED RESEARCH OR DEVELOPMENT

The invention was made with Government support under Contract No. DE-FG36-08GO18128. The Government has certain rights to the invention.

TECHNICAL FIELD

This disclosure relates to electro-hydraulic tools for trimming or joining sheet metal panels.

BACKGROUND

Manufacturing parts from sheet metal normally requires trimming and welding sheet metal panels. In conventional manufacturing processes, mild steel is used because of its ductility and because it is easy to trim and weld. Many new materials have been proposed for manufacturing sheet metal parts, such as deep drawing quality steels, drawing quality steels, bake hardenable steels, dual phase steels, boron sheets, and aluminum alloys. Lightweight material and high strength materials are now being proposed instead of mild steel in the manufacture of vehicles to increase fuel economy. Working with these types of lightweight materials using conventional sheet metal forming tools and welding processes causes substantial problems in manufacturing processes.

In trimming operations, harder materials require more force to trim scrap from the metal panels. In addition, greater clearance may result when trimming higher strength metal panels because of greater forces being applied to the tool. With conventional mild steel, clearance of less than 10% of the material thickness is generally recommended. Additional clearance may result in the formation of burrs, splits and slivers along the trimmed edge of the metal panel. In addition, increased clearance also may result in increased wear of the tool steel edges. Wear of the tool steel edges can be addressed by resharpening the trimmed steel edges or by shimming the trimmed steel insert that increases manufacturing costs.

Another solution proposed is to include elastic scrap support adjacent to trimmed steels to reduce bending and formation of burrs as proposed by Applicant in U.S. Pat. No. 7,197,970. The use of the elastic scrap supports according to Applicant's prior patent is well suited to perpendicular trimming operations. However, if large angle cuts are required to be made by cam operated trim steel tools that may require cutting angles of up to 60°, the effectiveness of the elastic scrap supports is reduced.

In Applicant's prior U.S. Pat. No. 7,810,366, electro-hydraulic trimming, flanging and hemming a blank is proposed, but large volumes of liquid must be provided to the electro-hydraulic tool. The use of large volumes of liquid reduces machine cycle time because of the need to drain and fill the electro-hydraulic chamber. In addition, increased voltage is required to provide sufficient force for trimming, flanging and hemming panels with greater liquid volumes in larger electro-hydraulic chambers. Also, increasing the spacing between the multiple electrodes that are discharged and the location of the area of the panel that is acted upon reduces the pressure available from the electro-hydraulic pulse.

In welding operations, welding aluminum or mixed metals may require applying an adhesive in the joined area to obtain the required bond strength. The addition of an adhesive adds weight and cost to the finished panel and also complicates the manufacturing process. Spot welding operations and other thermal welding techniques rely upon localized melting of the material of the sheet metal panels. Localized melting reduces the strength and may lower the performance of the finished parts. Electromagnetic welding has been proposed to bond aluminum and other mixed metal assemblies. However, electromagnetic welding relies upon coils that have a short life and are costly to replace. In addition, electromagnetic welding is not particularly effective when applied to materials having poor electrical conductivity.

The above manufacturing challenges and problems relating to trimming and joining lightweight sheet metal panels are addressed by Applicant as summarized below.

SUMMARY

This disclosure proposes replacing trimmed steel edges and inserts on sheet metal dies with small volume electro-hydraulic chambers that extend about the periphery of the die. The electro-hydraulic chambers are provided with a wire that is disposed in a liquid and is connected to a source of stored charge. Small volume electro-hydraulic chambers extend about the periphery of the die. A pressure pulse is generated in the liquid when the stored charge is discharged through the wire. The high voltage discharge disintegrates the wire. The pressure pulse drives the panel against trimmed steel edges of tool steel inserts disposed on the opposite side of the panel from the electro-hydraulic chamber.

Utilizing similar small volume electro-hydraulic chambers, it has been found that the high pressure pulse transmitted through the liquid may drive one panel into another panel at a high velocity. A fixed electrode may be connected to a source of stored charge in a small liquid filled chamber to make a spot joint. Alternatively, the electro-hydraulic chamber may be provided with a wire that is connected to a stored charge source that is discharged through the wire to create the pressure pulse in the electro-hydraulic chamber. The electro-hydraulic chamber may be an elongated channel that is disposed adjacent to the surface of one of the panels that is to be joined to another panel or to a hemmed edge.

Applicant's disclosure as summarized above will be better understood in view of the attached drawings and the following detailed description of the illustrated embodiments.

DETAILED DESCRIPTION

A detailed description of the illustrated embodiments of the present invention are provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
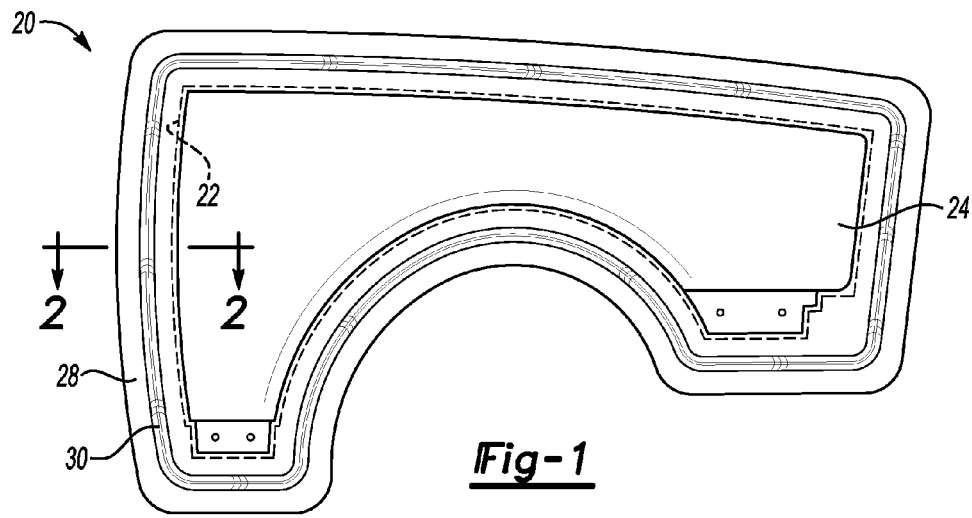
FIG. 1 is a diagrammatic plan view of a partially formed sheet metal part.

Referring to FIG. 1, a drawn blank 20 comprising a sheet metal blank that has been drawn to the form of a vehicle quarter panel is illustrated in its "as drawn" condition. The blank 20 has not been trimmed. The location of a trimmed edge 22 is illustrated as a dashed line. Portions of the blank 20 outboard of the trimmed edge 22 are trimmed from the blank 20 to create a trimmed panel 24. The portion of the blank 20 outboard of the trimmed edge 22 is the scrap portion 28 that may also be referred to as offal. The draw bead 30 is shown in the scrap portion 28. The draw bead 30 is removed with the scrap portion 28.

Figure 2:
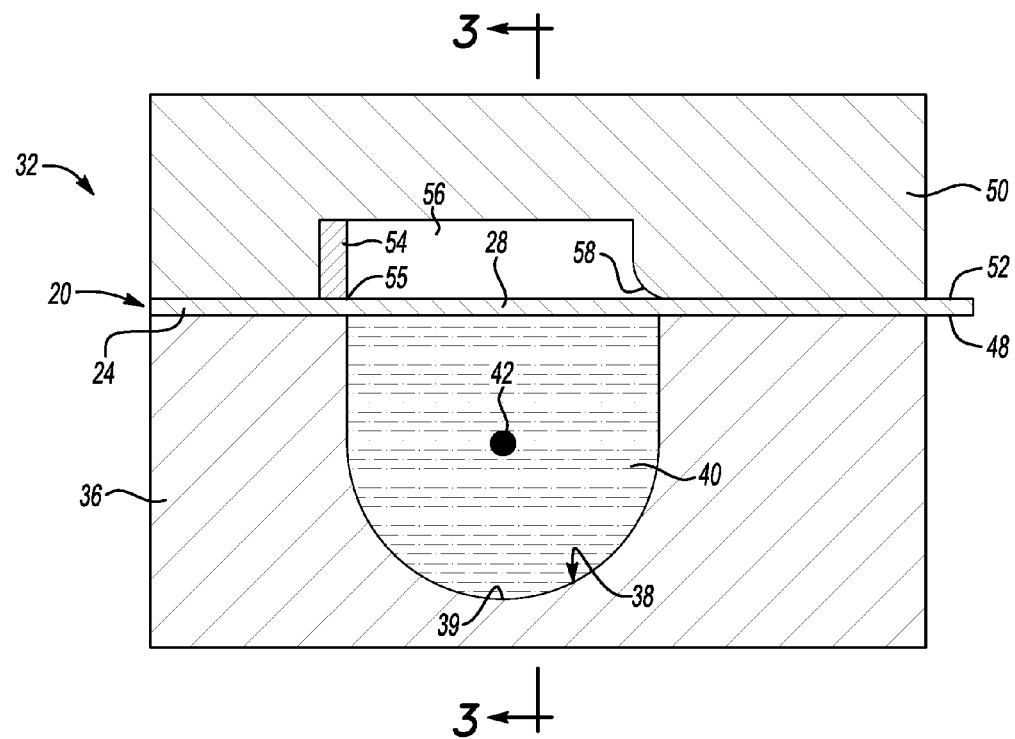
FIG. 2 is a diagrammatic cross-sectional view of an electro-hydraulic forming tool at a location on the sheet metal part at line 2-2 in FIG. 1.

Referring to FIG. 2, a portion of a trimming tool 32 is diagrammatically illustrated. The trimming tool 32 includes a lower tool 36, as shown in FIG. 2. It should be understood that references to the lower tool 36 are equally applicable to an upper die in the event that the tool is inverted. The terms "lower" and "upper" when used to describe the die parts should not be interpreted to limit the disclosed concept to the illustrated embodiment or any specific spatial orientation. A liquid chamber 38 is provided in the lower tool 36 that is filled with a liquid 40. The liquid may be water with additives, such as a rust preventative. A wire electrode 42 is shown disposed in the liquid 40 in a spaced relationship relative to the size of the liquid chamber and is preferably centrally located within the liquid chamber 38. The fluid chamber 38 may have a concave wall 39 that focuses the pulse created when a high voltage discharge is applied to the wire 42. The blank 20 is shown disposed on the lower tool 36 with a first side 48 of the blank 20 enclosing the liquid 40 within the chamber 38. An upper die 50, which again could be a lower tool if the die is inverted and should not be construed as limiting the concept, is illustrated engaging a second side 52 of the blank 20. A tool steel insert 54 that has a cutting edge 55 is provided in the upper die 50 that also engages the second side 52 of the blank 20. In the trimming tool embodiment, the tool steel insert 54 may also be referred to as an anvil area in that the blank 20 is driven against the tool steel insert 54. A trim clearance area 56 is provided on the opposite side of the blank 20 from the liquid chamber 38 and is adjacent to the tool steel insert 54. A radiused edge 58 is provided on the upper die 50 on the opposite side of the trim clearance area 56 from the tool steel insert 54. The radiused edge 58 is provided to avoid cutting or splitting the blank 20 in the area of the radiused edge 58.

Figure 3:
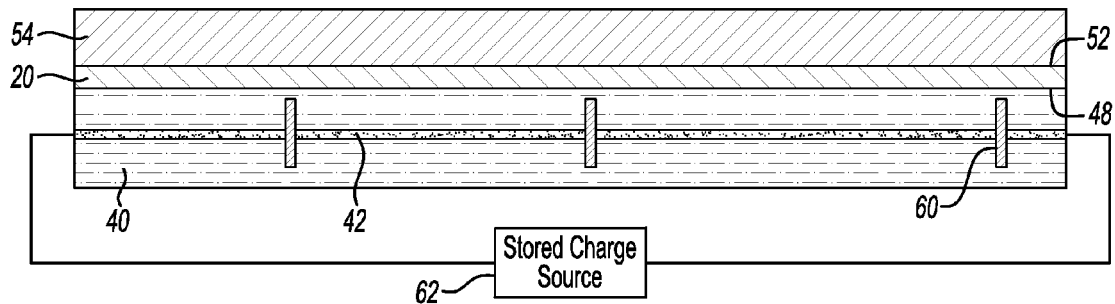
FIG. 3 is a diagrammatic cross-sectional view of an electro-hydraulic forming tool taken along the line 3-3 in FIG. 2.

Referring to FIGS. 2 and 3, the blank 20 is shown with the tool steel insert 54 engaging the second side 52 of the blank 20. The wire electrode 42 is supported by several spacers 60, so that it does not engage the lower tool 36 in the liquid chamber 38. The spacers may hold the wire electrode 42 at or near the focal point of the concave surface 39. The wire electrode 42 is connected to a stored charge source 62 that may be a bank of capacitors that are charged to provide a high voltage discharge through the wire electrode 42, as will be more fully described with reference to FIG. 4 below. The wire electrode 42 is disposed in the liquid 40 that separates the wire electrode 42 from the blank 20 and the lower tool 36. As shown in FIGS. 2 and 3, the blank 20 is in position to be trimmed by the tool steel insert 54 when the wire electrode 42 receives the high voltage discharge from the stored charge source 62.

Figure 4:
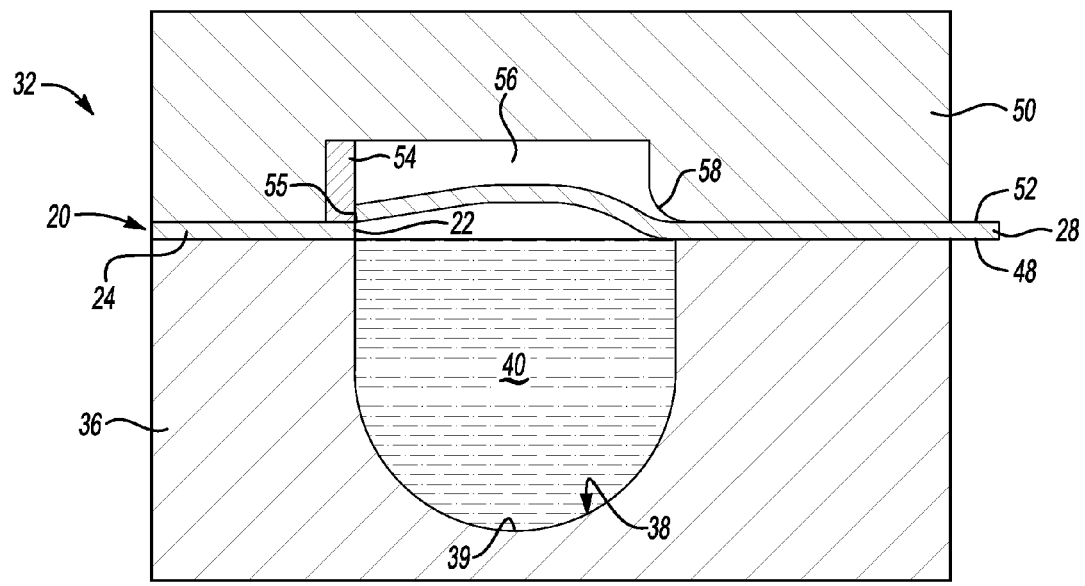
FIG. 4 is a diagrammatic cross-sectional view showing an electro-hydraulic forming tool after an electro-hydraulic trimming operation is performed.

Referring to FIG. 4, the blank 20 is shown after the wire electrode 42 (shown in FIGS. 2 and 3) has received the high voltage discharge from the stored charge source 62 and has disintegrated during the electrical discharge resulting in a pulse being generated through the liquid 40 against the first side 48 of the blank 20. The pulse is also reflected off of the concave surface 39. The blank 20 is driven by the pulse against the tool steel insert 54 to form the trimmed edge 22 on the trimmed panel 24. The portion of the blank 20 outboard of the trimmed edge 22 is driven against the tool steel insert 54 into the trim clearance area 56. Part of the blank is driven against the radiused edge 58, but is not severed from the blank 20 and becomes the scrap portion 28. Additional scrap cutters may be provided that extend transverse and outwardly from the tool steel insert 54 to cut the scrap portion, or offal, into segments.

In FIG. 4, the liquid 40 remains substantially within the chamber 38 formed in the lower tool 36. The upper die 50 engages the blank 20 and holds both the trimmed panel 24 and the scrap portion 28 in place during the high voltage discharge through the wire electrode 42.

Figure 5:
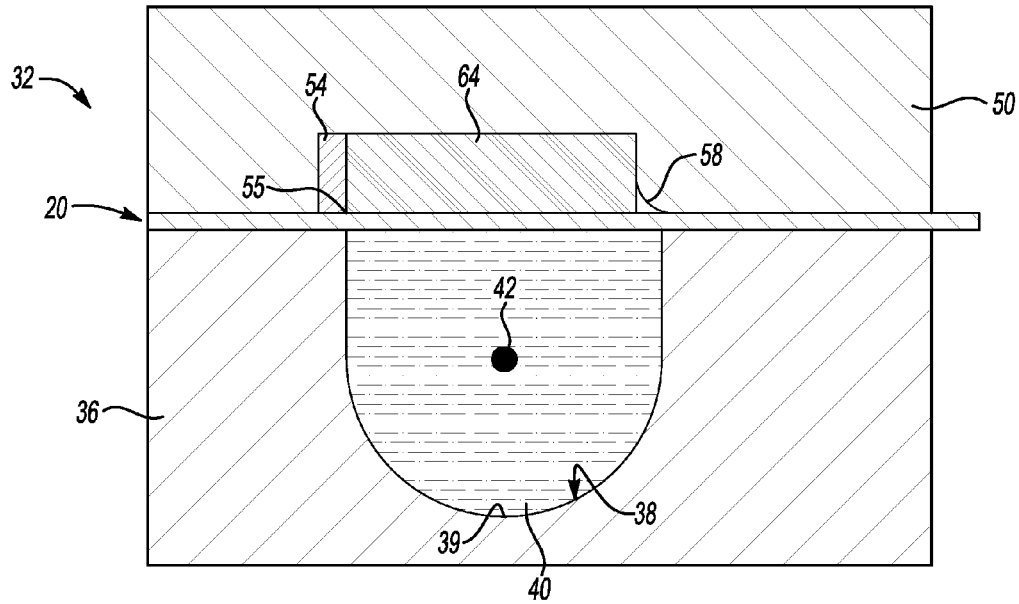
FIG. 5 is a diagrammatic cross-sectional view of an alternative embodiment of an electro-hydraulic forming tool showing a blank disposed in the electro-hydraulic trimming tool prior to the trimming operation.
Figure 6:
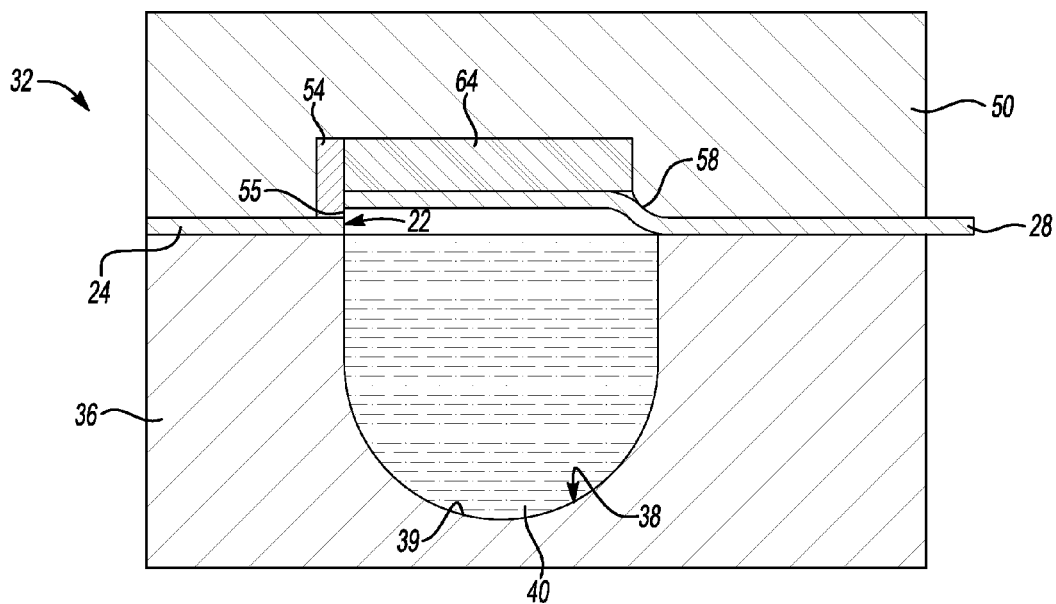
FIG. 6 is a diagrammatic cross-sectional view of the electro-hydraulic trimming tool shown in FIG. 5 after the trimming operation is performed.

Referring to FIGS. 5 and 6, an alternative embodiment of the trimming tool 32 is shown. In the alternative embodiment, the blank 20 is disposed on the lower tool 36 and covers the liquid 40 that is contained within the liquid chamber 38. A wire electrode 42 is shown in FIG. 5 that is supported by spacers similar to the spacers 60, shown in FIG. 3. The upper die 50 supports a tool steel insert 54 and also defines a radiused edge 58, as previously described with reference to FIGS. 2-4. In the embodiments of FIGS. 5 and 6, a scrap support block 64 is provided between the tool steel insert 54 and the radiused edge 58 of the upper die 50. The scrap support block 64 may be made of a resilient polymer material such as polyurethane. The scrap support block 64 supports the scrap portion 28 during the trimming process.

Referring to FIG. 6, the trimming tool 32 is shown after the wire electrode 42 receives the high voltage discharge from the stored charge source 62 (shown in FIG. 3). The liquid 40 remains in the chamber 38 formed in the lower tool 36. In FIG. 6, the trimmed edge 22 is formed by trimming the scrap portion 28 as a result of discharging the stored charge source through the wire electrode (shown in FIG. 5) that is disintegrated in FIG. 6. The pulse transmitted through the liquid 40 causes the scrap portion 28 to be cut against the tool steel insert 54. The scrap portion 28 compresses the scrap support block 64 which functions to control the movement of the scrap portion 28.

Figure 7:
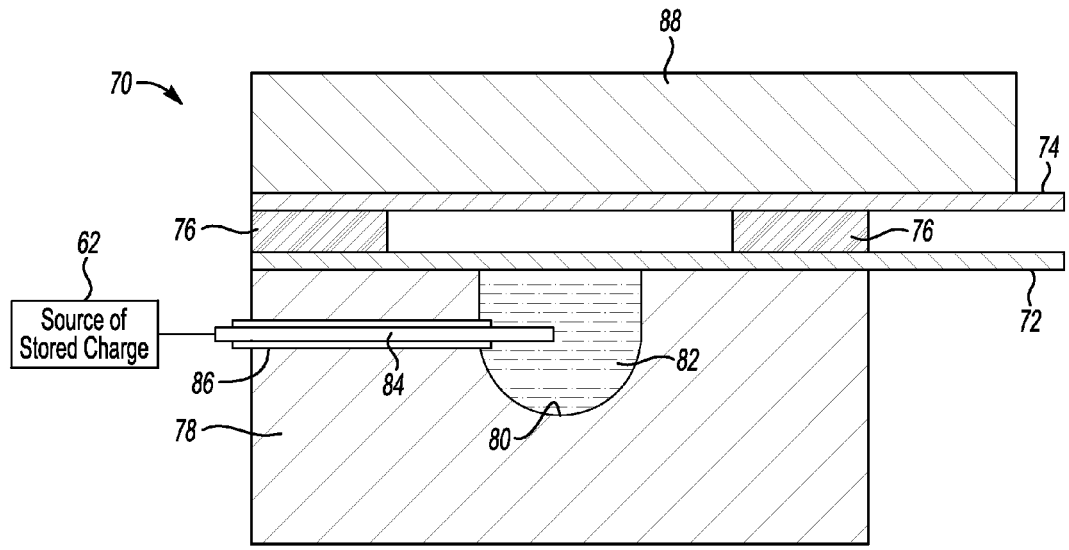
FIG. 7 is a diagrammatic cross-sectional view of a spot joining tool before joining.

Referring to FIG. 7, a spot joining tool 70 is shown with a first sheet of metal 72. The first sheet 72, or thickness, of metal may be referred to as the accelerated sheet in the process description. A second sheet of metal 74 is also illustrated. The second sheet, or thickness, of metal 74 may also be referred to as the fixed blank or fixed tube wall in the process description. The first and second sheets may be two separate sheets or a single sheet with a reversely bent edge. Spacer block 76 is shown spacing the first sheet 72 from the second sheet 74. A pulse tool member 78 is diagrammatically shown and may be part of a larger tool. The pulse tool member 78 defines a chamber 80 that is filled with a liquid 82, such as water or water with rust preventative additives. An electrode 84 is disposed in the chamber 80 and immersed in the liquid 82. The electrode 84 is electrically isolated from the pulse tool member 78 by an insulator sleeve 86. A backing plate 88 is assembled to the second sheet 74 to hold the second sheet 74 in place during a joining operation. In the joining tool embodiment, the backing plate 88 may be referred to as an anvil area because the first sheet of metal 72 is driven against the second sheet 74 that is supported thereon.

Figure 8:
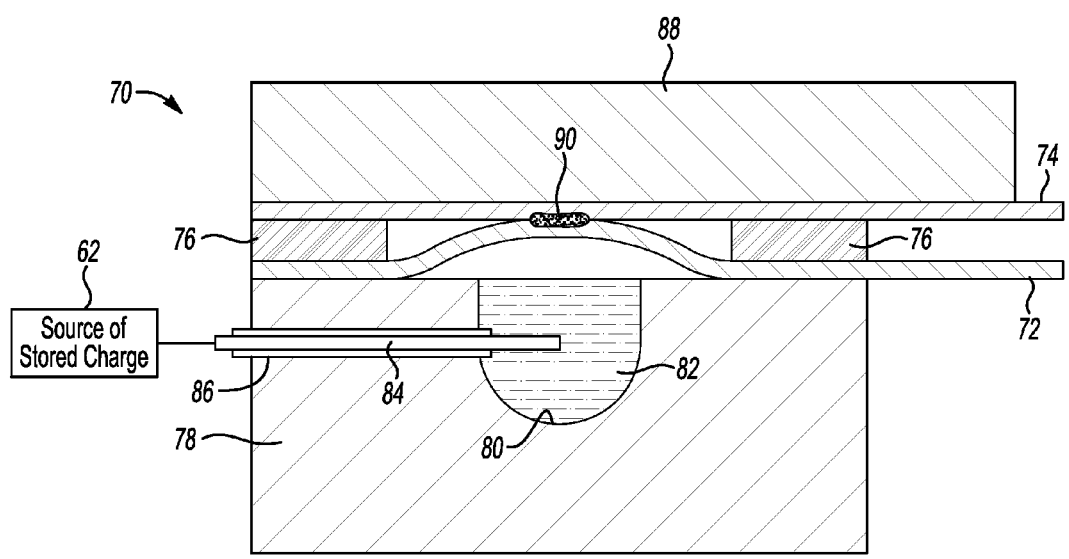
FIG. 8 is a diagrammatic cross-sectional view of the spot joining tool shown in FIG. 7 after joining.

Referring to FIG. 8, a joint 90 is formed when a stored charge source 62, similar to the stored charge source 62 shown in FIG. 2, is electrically connected to the electrode 84. When the stored charge source 62 is discharged, a pulse of electrical energy is discharged from the electrode 84 to the pulse tool member 78, or may alternatively be discharged to a second spaced electrode (not shown). When the high voltage pulse is discharged through the electrode 84, a pulse is transmitted through the liquid 82 that displaces the first panel 72, as shown in FIG. 8, causing it to be accelerated into the second panel 74. The second panel 74 is held in place by the backing plate 88. Acceleration of the first panel 72 into the second panel 74 creates the joint 90. A joint formed by the pulse tool member 78 shown in FIGS. 7 and 8 is similar to a spot weld in that it creates a single joined area in a spot location creating a substantially circular joined area the first and second sheets 72 and 74 together.

Figure 9:
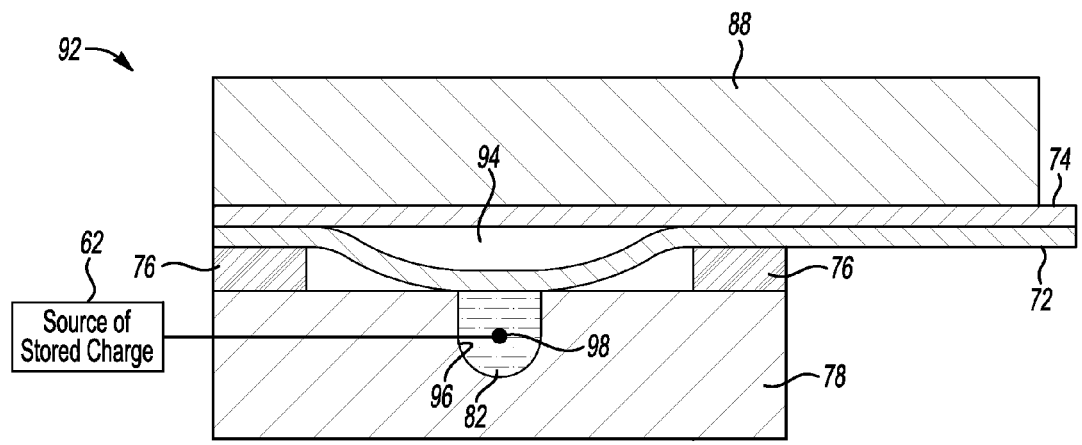
FIG. 9 is a diagrammatic cross-sectional view of an elongated joining tool before joining.
Figure 10:
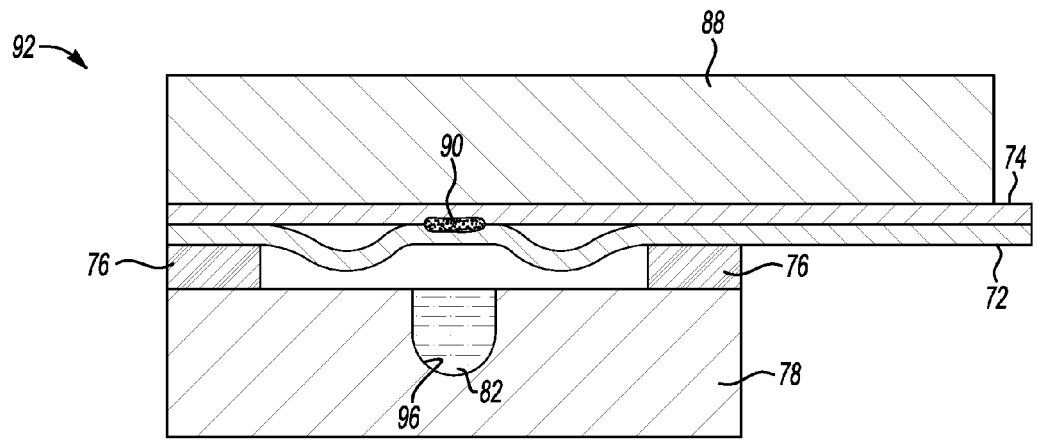
FIG. 10 is a diagrammatic cross-sectional view of the elongated joining tool shown in FIG. 9 after joining.

Referring to FIGS. 9 and 10, a linear joining tool 92 is shown. Due to the similarities between the embodiment of FIGS. 7-8, similar reference numerals are used to refer to similar parts. The linear joining tool 92 includes a pulse tool member 78 that defines an elongated channel 96 in which an electrode wire 98 is disposed. The elongated channel 96 contains the liquid 82 that envelopes the electrode wire 98. The electrode wire 98 is electrically connected to a source of stored charge 62, as previously described with regard to FIGS. 7 and 8. The first sheet 72 includes a preformed local cavity 94. The first sheet spans the elongated channel 96, as shown in FIG. 9, until the stored charge source 62 is discharged through the electrode wire 98.

As shown in FIG. 10, after discharge, the electrode wire 98 shown in FIG. 9 disintegrates as a pulse is transmitted through the liquid 82 to cause a joined area 90 to be formed in an elongated path that corresponds to the shape of the elongated channel 96. The elongated channel may be straight or curved. The joined area 90 is formed by accelerating the preformed local cavity 94 formed on the first sheet 72 against the second sheet 94 formed that is held in place by the backing plate 88. Spacer blocks 76 separate the pulse tool member 78 from the first sheet 72.

Figure 11:
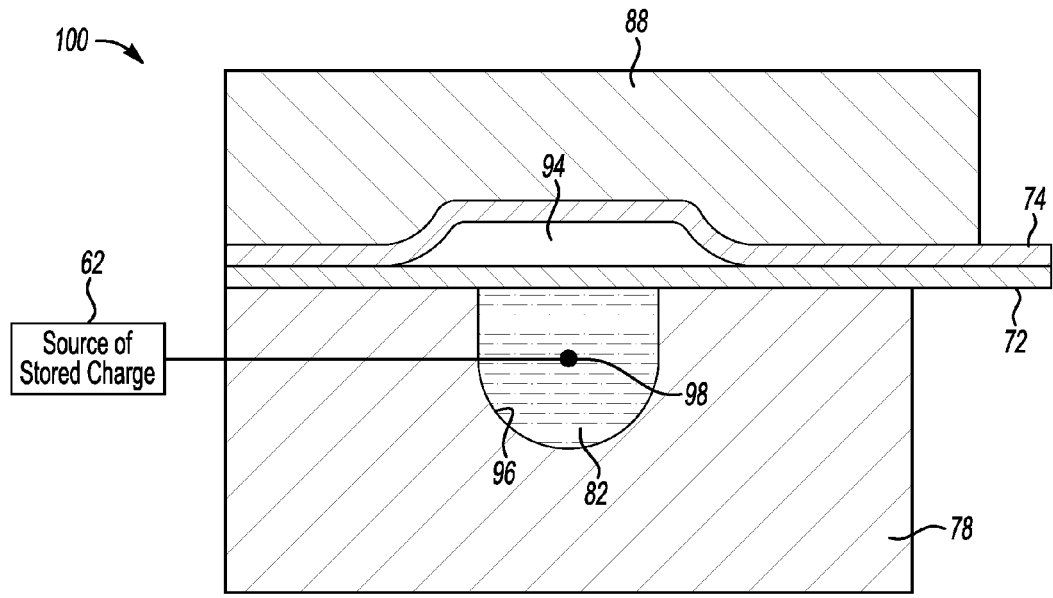
FIG. 11 is a diagrammatic view of an elongated joined area and clinch tool before joining.
Figure 12:
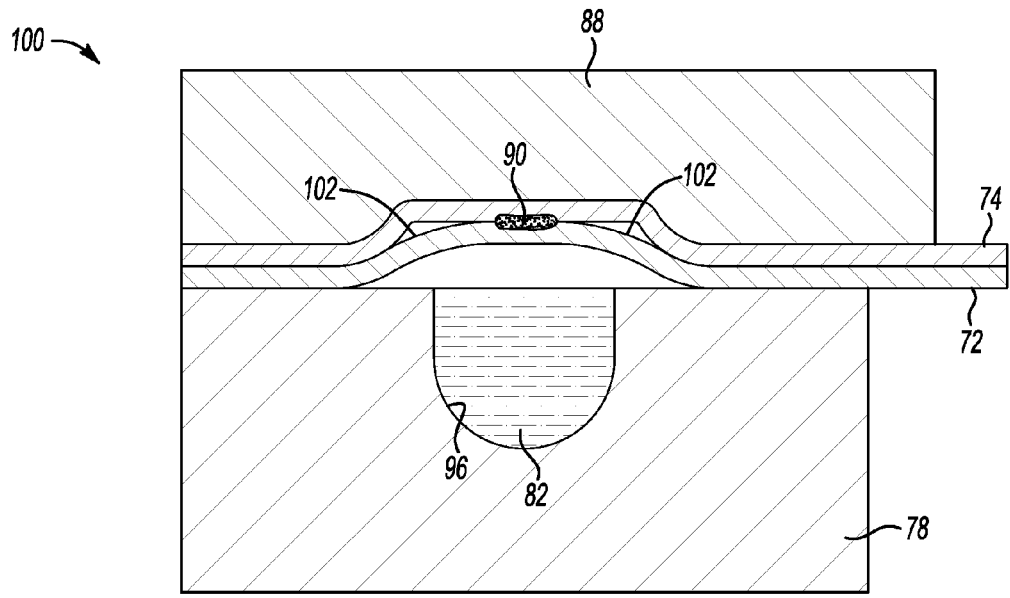
FIG. 12 is a diagrammatic view of the elongated joined area and clinch tool shown in FIG. 11 after joining.

Referring to FIGS. 11 and 12, a crimp joining tool is illustrated that is similar in many ways to the embodiments of FIGS. 7-10. The same reference numerals will be used to refer to similar parts of the preceding embodiments. The joining crimp tool 100 includes a first sheet 72 that is disposed on the pulse tool member 78 to enclose the elongated channel 96 that is filled with liquid 82. The electrode wire 98 is electrically connected to the stored charge source 62 in FIG. 11. A preformed local cavity 94 is formed in the second sheet 74 in FIG. 11. The second sheet 74 and preformed local cavity 94 are backed by the backing plate 88.

Referring to FIG. 12, the joined area 90 is formed as a result of the discharge of the stored charge source 62 through the electrode wire 98 (shown in FIG. 11). The joined area 90, as shown in FIG. 12, is augmented by the formation of two crimped areas 102 on either side of joined area 90. The joined area 90 is formed by accelerating the first panel 72 into the second panel 74 that is held in place by the backing plate 88.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tool for modifying a workpiece comprising:
   an electro-hydraulic tool that engages a first side of the workpiece and defines a channel;
   a die engages a second side of the workpiece and defines an anvil area at a portion of the perimeter of the die;
   a wire electrode disposed within the channel;
   a volume of liquid provided in the channel;
   a spacer disposed between the wire electrode, the workpiece and the channel that prevents the wire electrode from contacting the workpiece and the tool;
   a source of stored electrical charge electrically connected to the wire electrode that provides a high voltage discharge through the wire electrode and creates a pulse in the channel that is transmitted through the liquid to drive the workpiece against the anvil area; and
   an elastic scrap support that engages the second side of the workpiece that is adjacent to a tool steel insert that defines a cutting edge, wherein the scrap support restrains a scrap portion of the workpiece as the workpiece is trimmed.

2. The tool of claim 1 further comprising a tool steel insert that defines the cutting edge and trims the scrap portion of the workpiece that is outboard of the cutting edge.

3. The tool of claim 1 wherein the channel includes a concave surface having an axis that extends parallel to a lengthwise direction of the channel.

4. The tool of claim 3 wherein the wire electrode is positioned in the focal point of the concave surface such that the pulse generated by the high voltage discharge through the wire electrode reflects off the partially cylindrical surface.

5. The tool of claim 1 wherein a plurality of trimming edges are provided to trim a plurality of portions about the perimeter of the die.

6. A method of joining a first panel and a second panel of a workpiece comprising the steps of:
   selecting an electro-hydraulic tool that defines a chamber that is formed by a wall that defines an opening in one side;
   providing an electrode in the chamber in a spaced relationship relative to the wall of the chamber and the opening in the one side;
   connecting the electrode to a source of stored electrical charge;
   filling the chamber with a liquid;
   placing the first panel and the second panel that is initially at least partially spaced from the first panel between the electro-hydraulic tool across the opening on the one side of the chamber and a backing plate; and discharging the source of stored electrical charge through the electrode to create a pulse that is transmitted through the liquid driving the first panel into engagement with the second panel to join the first panel to the second panel.

7. The method of claim 6 wherein the electrode is a wire electrode, and the channel is an elongated channel wherein the wire electrode extends lengthwise in the elongated channel.

8. The method of claim 7 wherein the wire electrode is retained by spacers that prevent the wire electrode from contacting a wall of the chamber and the first workpiece.

9. The method of claim 6 wherein a preformed local cavity is formed in the second panel, and wherein the step of discharging the source of stored electrical charge crimps the first panel to the second panel.

10. The method of claim 6 wherein the electrode extends through a wall of the electro-hydraulic tool and is disposed at least partially within an insulator sleeve.

11. The method of claim 10 wherein the joining of the first panel to the second panel is a spot joined area.

12. A tool for modifying a workpiece comprising:
an electro-hydraulic tool that engages a first side of the workpiece and defines a channel;
a die engages a second side of the workpiece and defines an anvil area at a portion of the perimeter of the die;
a wire electrode disposed within the channel;
a volume of liquid provided in the channel;
a spacer disposed between the wire electrode, the workpiece and the channel that prevents the wire electrode from contacting the workpiece and the tool;
a source of stored electrical charge electrically connected to the wire electrode that provides a high voltage discharge through the wire electrode and creates a pulse in the channel that is transmitted through the liquid to drive the workpiece against the anvil area, wherein the workpiece further comprises a first panel and a second panel, the first panel providing the first side and engaging the anvil area and the second panel providing the second side of the workpiece and initially being spaced from the first panel, wherein the pulse drives the second panel into engagement with the first panel to cause the second panel to be joined to the first panel.

* * * * *